(12) United States Patent
Spindler

(10) Patent No.: US 11,311,353 B2
(45) Date of Patent: Apr. 26, 2022

(54) SUPERSTRUCTURE SUPPORT HAVING SPECIAL INNER AND OUTER GEOMETRY

(71) Applicant: Bruno Spindler, Oppenau (DE)

(72) Inventor: Bruno Spindler, Oppenau (DE)

( * ) Notice: Subject to any disclaimer, the term of this patent is extended or adjusted under 35 U.S.C. 154(b) by 560 days.

(21) Appl. No.: 16/319,325

(22) PCT Filed: Jul. 18, 2017

(86) PCT No.: PCT/DE2017/000211
§ 371 (c)(1),
(2) Date: Jun. 23, 2019

(87) PCT Pub. No.: WO2018/014896
PCT Pub. Date: Jan. 25, 2018

(65) Prior Publication Data
US 2020/0093578 A1 Mar. 26, 2020

(30) Foreign Application Priority Data

Jul. 20, 2016 (DE) .................... 10 2016 008 668.8

(51) Int. Cl.
*A61C 8/00* (2006.01)

(52) U.S. Cl.
CPC .......... *A61C 8/0022* (2013.01); *A61C 8/0068* (2013.01); *A61C 8/0054* (2013.01);
(Continued)

(58) Field of Classification Search
CPC ..... A61C 8/0022; A61C 8/0048; A61C 8/005; A61C 8/0051; A61C 8/0053;
(Continued)

(56) References Cited

U.S. PATENT DOCUMENTS

| | | | | |
|---|---|---|---|---|
| 5,069,622 A | * | 12/1991 | Rangert | A61C 8/0068 433/173 |
| 5,195,891 A | * | 3/1993 | Sulc | A61C 8/005 433/173 |

(Continued)

FOREIGN PATENT DOCUMENTS

| | | | |
|---|---|---|---|
| DE | 9202396 | * | 4/1992 |
| DE | 9417182 U1 | | 2/1995 |

(Continued)

*Primary Examiner* — Ralph A Lewis
(74) *Attorney, Agent, or Firm* — Smartpat PLC

(57) ABSTRACT

The invention relates to a superstructure support (20) as part of a prosthetic tooth replacement (1) between an implant body (10) and a superstructure, comprising a hollow implant post (23), a hollow implant pin (50), and an implant flange (31) lying therebetween. The cavity zones (67, 62) of the implant post (23) and of the implant pin (50) transition into each other. The cavity zones have respective center lines (69, 63), which include an angle of 60 to 86 angular degrees. The cavity zone (62) of the implant pin (50) has a screw head seat surface (65) that widens toward the implant flange. At least some areas of the implant flange form a supporting enveloping surface (37), which is oriented toward the implant post (23) and the outer edge (33) of which spans a reference plane (38), which is perpendicularly intersected by the center line (69) of the post-side cavity zone (67). The center lines of the implant post (23) and of the implant pin (50) intersect or cross below the reference plane (38). By means of the invention, a superstructure support (20) for the prosthetic tooth replacement is improved in such a way that a secure and lasting screwed connection to the implant body is ensured.

8 Claims, 4 Drawing Sheets

(52) U.S. Cl.
CPC .......... *A61C 8/0066* (2013.01); *A61C 8/0069* (2013.01); *A61C 8/0089* (2013.01)

(58) Field of Classification Search
CPC ... A61C 8/0054; A61C 8/0056; A61C 8/0059; A61C 8/006; A61C 8/0066; A61C 8/0068; A61C 8/0069; A61C 8/0072
See application file for complete search history.

(56) References Cited

U.S. PATENT DOCUMENTS

| | | | | |
|---|---|---|---|---|
| 5,571,015 | A * | 11/1996 | Siegmund | A61C 8/005 |
| | | | | 433/173 |
| 5,662,475 | A * | 9/1997 | Mena | A61C 8/005 |
| | | | | 433/172 |
| 5,947,733 | A * | 9/1999 | Sutter | A61C 8/0089 |
| | | | | 433/173 |
| 10,188,487 | B2 * | 1/2019 | Spindler | A61C 8/0077 |
| 2002/0031749 | A1 | 3/2002 | Morgan | |
| 2007/0037122 | A1 * | 2/2007 | Bassett | A61C 8/0077 |
| | | | | 433/173 |
| 2009/0117520 | A1 * | 5/2009 | Kikuchi | A61C 8/005 |
| | | | | 433/174 |
| 2009/0298013 | A1 * | 12/2009 | Baruc | A61C 8/0065 |
| | | | | 433/174 |
| 2011/0014588 | A1 * | 1/2011 | Seavey | A61C 8/0059 |
| | | | | 433/174 |
| 2011/0183290 | A1 | 7/2011 | Galgut et al. | |
| 2012/0322030 | A1 * | 12/2012 | Fromovich | A61C 8/0089 |
| | | | | 433/173 |
| 2013/0143178 | A1 | 6/2013 | Ophuysen | |
| 2015/0272709 | A1 * | 10/2015 | Kim | A61C 8/0048 |
| | | | | 433/169 |
| 2015/0335401 | A1 | 11/2015 | Robichaud et al. | |
| 2016/0206408 | A1 | 7/2016 | Spindler et al. | |
| 2017/0239019 | A1 * | 8/2017 | Kasem | A61C 8/0068 |
| 2019/0298498 | A1 * | 10/2019 | Spindler | A61C 8/006 |

FOREIGN PATENT DOCUMENTS

| | | | |
|---|---|---|---|
| DE | 202012102746 U1 | | 8/2012 |
| DE | 102013013565 A1 | | 1/2015 |
| EP | 2644152 A1 | | 10/2013 |
| WO | 9842273 A1 | | 10/1998 |
| WO | WO 01/70127 | * | 9/2001 |
| WO | 2014012973 A2 | | 1/2014 |

* cited by examiner

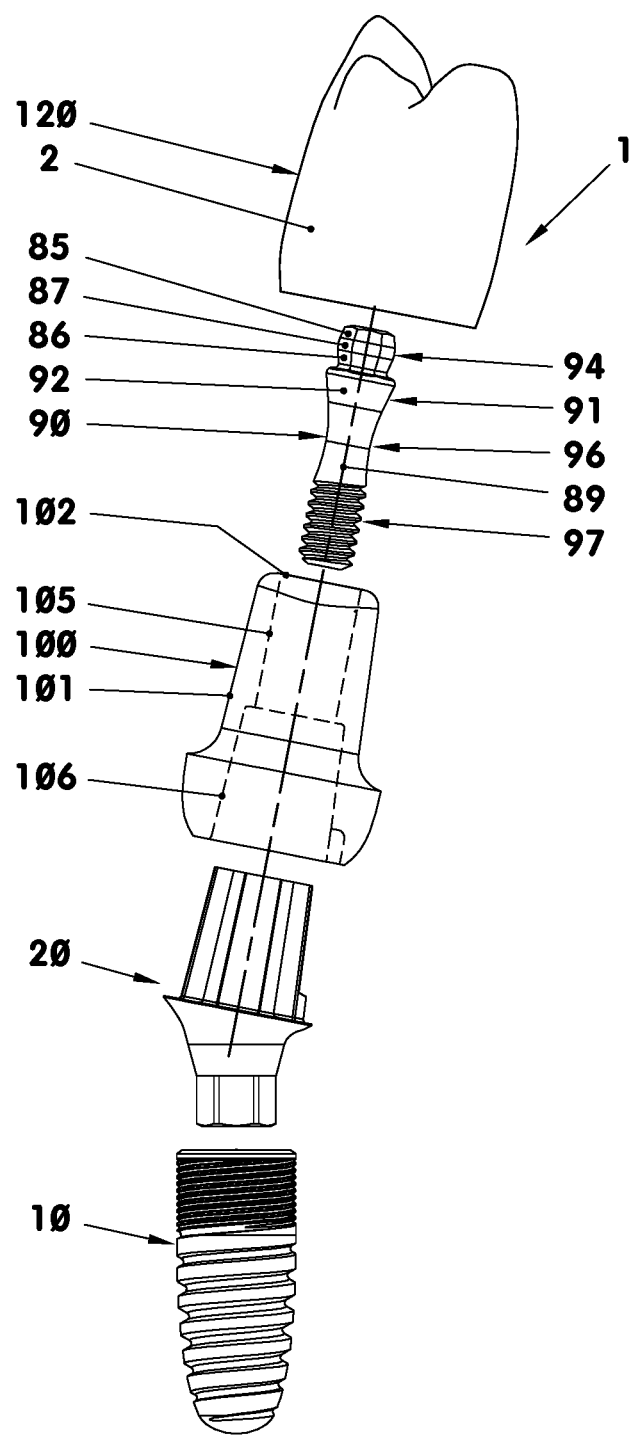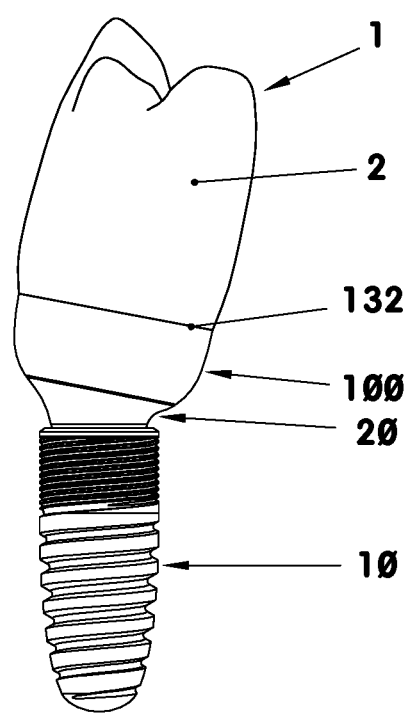
Fig. 1
Fig. 2

SUPERSTRUCTURE SUPPORT HAVING SPECIAL INNER AND OUTER GEOMETRY

TECHNICAL FIELD

The invention relates to a superstructure support as part of a prosthetic tooth replacement between an implant body and a superstructure, comprising a hollow implant post, a hollow implant pin, and an implant flange arranged therebetween.

BACKGROUND

In dental implantology, an endosseous implant body that carries the prosthesis is often used, for example, in the fabrication of a single prosthetic tooth replacement. In such a case, the implant body, a type of screw plug, is screwed into an artificially created hole in the patient's jaw. The screwed-in implant body receives a superstructure support for the fabricated prosthesis. The latter may be screwed into the implant body with a special screw in a rotationally fixed manner. A superstructure forming the visible tooth crown is placed directly or indirectly on the superstructure support, for example by bonding.

A tooth implant mounting system is known from DE 20 2012 102 746 U1, with which an implant body, a superstructure support, an adhesive body and an artificial crown form an artificial tooth replacement.

The present invention is based on the problem of improving a superstructure support in such a manner that a secure and permanent screw connection with the implant body is ensured.

SUMMARY

This problem is solved by a superstructure support forming part of a prosthetic tooth replacement between an implant body and a superstructure. The superstructure support includes a hollow implant post, a hollow implant pin, and an implant flange arranged between the hollow implant post and the hollow implant pin. Cavity zones of the implant post and the implant pin transition into each other to conduct and receive a screw connecting the superstructure support and the implant body. Each of the cavity zones has centerlines that include an angle of 160 to 186 angular degrees. The cavity zone of the implant pin has a screw head seat space that widens towards the implant flange. At least some areas of the implant flange form a support enveloping surface oriented towards the implant post, the outer edge of which spans a reference plane that is cut perpendicularly by the centerline of the cavity zone on the side of the post. The centerlines of the implant post and the implant pin intersect or cross below the reference plane.

The superstructure support is arranged between an implant body and a superstructure, wherein the superstructure support has an implant post in an area supporting the adhesive body and/or tooth crown and at least one implant neck in the area turned towards the gum and the implant body. The superstructure support is fabricated from a blank, which is produced, for example, by means of a powder injection molding process. Titanium alloy Ti6A14V may be used as the metal powder. In the area supporting the adhesive body and/or tooth crown, the injection mold gives the blank a shape mathematically similar to the finished shape. In the area turned towards the gum and the implant body, the injection mold gives the blank the shape of a raw pin. The raw pin obtains its finished shape through mechanical and/or optical separation machining, whereby an implant flange turned towards the gum is formed, in the surface of which turned towards the gum a structure is incorporated at least in some areas.

The superstructure support has an implant post whose outer shape corresponds to a straight truncated cone. The implant post is based on the implant flange of the superstructure support from which it protrudes perpendicularly. The outer edge of the implant flange, for example, has a circular shape, with its center oriented in a manner concentric to the centerline of the implant post. In this manner, an adhesive body and/or a tooth crown can be placed on the individual implant post, which is made, for example, of a rotationally symmetrical blank.

The superstructure support has a continuous, angled cavity, which has, on the one hand, an internal screw seat and, on the other hand, a curved screw insertion channel. The screw seat located in the area of the lower end of the cavity is found below the axial mounting joint of the implant flange, by which the screw that fixes the superstructure support to the implant body receives a deep, stable fit. When the prosthetic restoration is mounted, the fixed and tight-fitting zone of the assembly joint that lies between the head of the screw and the superstructure support is at the same height as the fixed and tight-fitting zone of the assembly joint that is arranged between the implant body and the superstructure support. In the area of the specified assembly joint zone, the clamping force of the screw connection provides, among other things, a radial force component that promotes sealing effect and stability. At the same time, the load caused by thermal expansion is minimal due to the low screw head position, since the distance of the transmission of the clamping force between the screw head and the upper area of the implant thread is very short. Moreover, the lowering of the screw also allows the superstructure support to be angled closer to the bone, making it easier to adjust the prosthesis to a partially resorbed jawbone or to areas of the gums that have a low material thickness.

BRIEF DESCRIPTION OF THE DRAWINGS

FIG. 1: Exploded view of a prosthetic tooth replacement.
FIG. 2: Side view of the prosthetic tooth replacement.

DETAILED DESCRIPTION

Figure 3:
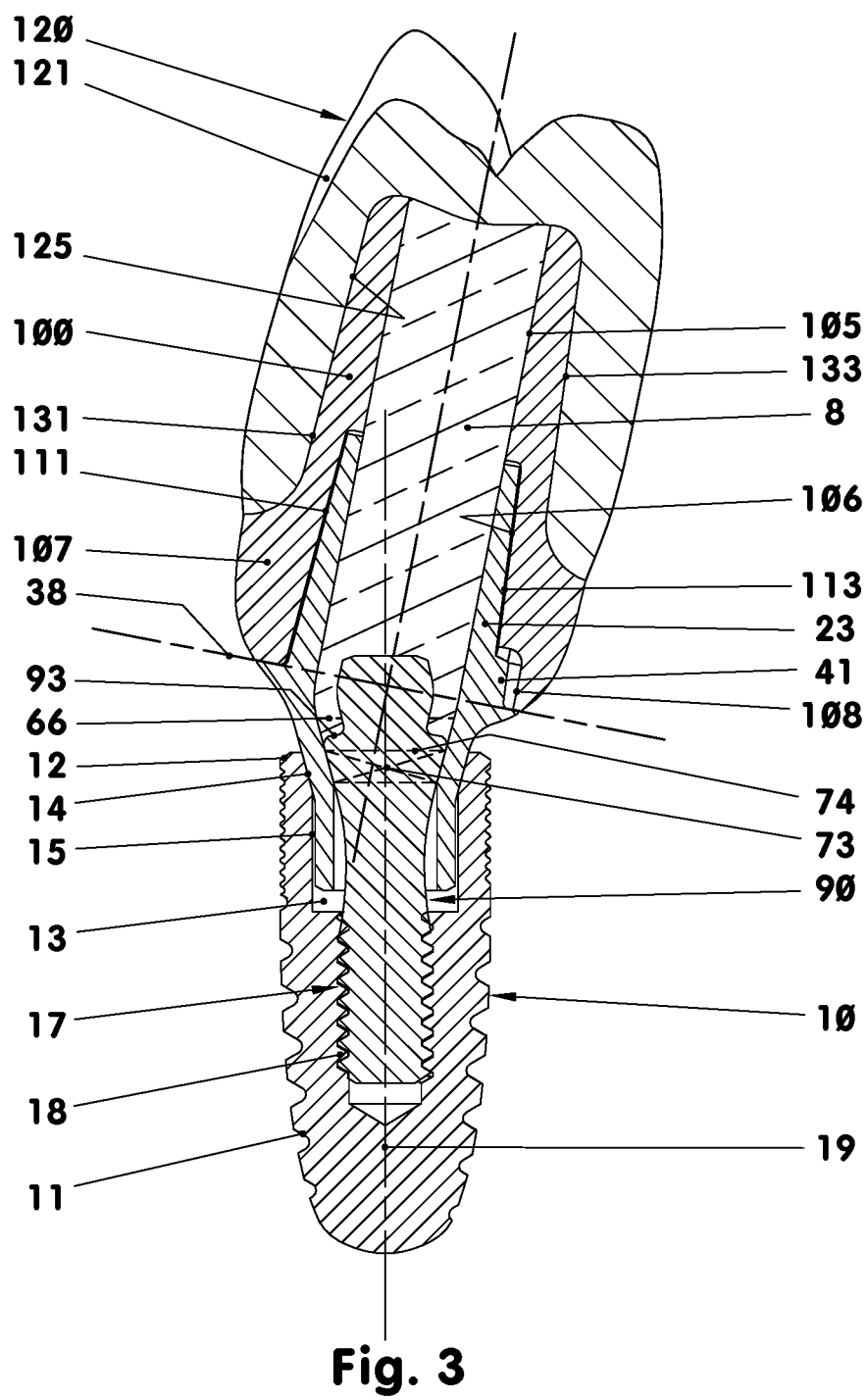
FIG. 3: Longitudinal section through a prosthetic tooth replacement, enlarged.

FIG. 1 shows an example of all parts of an artificial tooth (1) in the form of an exploded view. A hollow screw-type implant body (10) serves as the base. A superstructure support (20), in combination with an, for example, glued adhesive body (100) is screwed to the implant body (10) in a rotationally fixed manner by a special hexagon head screw (90). Generally, an artificial tooth crown (120) is placed and glued onto the adhesive body (100).

The implant body (10) is, according to FIGS. 1 to 3, a hollow screw with a possibly self-tapping (for example, non-metric) external thread (11). For example, with a diameter of 3.53 mm, it has a length of 8.42 mm. The implant body (10) has a multi-stage recess (13), which is divided into three zones as shown in FIG. 3. The first zone (14)—located in the area of the implant shoulder (12) of the implant body (10)—is, for example, an inner cone (14), which, for example, with a height of 0.65 mm, has a cone angle of, for example, 30 angular degrees, see FIG. 3. The inner cone (14)—as part of the second zone (15)—changes into a design serving as an anti-twist device, for example in the form of an inner hexagon socket. The inner hexagon socket (15) uses, for example with a height of 2.89 mm, a spanner gap of 2.1 mm. The inner hexagon socket (15), which can also be, for example, a double inner hexagon socket or another interlocking and/or frictionally locking anti-twist geometry, may be followed—not shown here—by a cylinder seat supporting the centering of the superstructure support (20) in the implant body (10). For example, the short cylinder seat then has a diameter that corresponds to the spanner gap of the inner hexagon socket (15).

The third zone (17) is a threaded hole that receives the hexagon head screw (90) holding the superstructure support (20) during assembly. Behind the end of the, for example, 2.9 mm-long M 1.6 internal thread (18), there is, for example, a short cylindrical thread outlet.

The superstructure support (20), which is e.g. 7.67 mm long, has the primary task—sitting in the implant body (10)—of serving as the base for the artificial tooth crown (120). It has an area (51) facing the implant body (10) and an area (21) that receives the tooth crown (120) or the superstructure, as the case may be, see FIGS. 4 and 5.

The area (51) facing the implant body (10) is the hollow implant pin (50). This consists of an implant neck (52) that is, for example, 1.04 mm long on average, with an outer cone (53) that is, for example, 0.94 mm long, an outer hexagon (54) that is, for example, 1.5 mm long, of the spanner gap of 2.1 mm, and a short cylinder projection, if present. The latter is not shown here.

The outer cone (53) and the outer hexagon (54) fit exactly in the recess (13) of the implant body (10). In the axial direction pointing towards the tip of the implant body (10), the end surfaces of the outer hexagon socket (54) and the short cylinder projection (if present) do not contact the recess (13).

Above the implant cone (53), for example, a plate-like implant flange (31) is connected; this, for example, emerges from the implant neck (52) with a continuous transition, see FIGS. 4 to 7. The lower side (32) of the implant flange (31) that is, for example, round, has, at least in some areas, the shape of the shell of a truncated cone, the cone angle of which opens towards the tooth crown (120). The cone angle is, for example, between 90 and 135 angular degrees. If necessary, the lower side of the implant flange (31) also consists of a multitude of partially uneven tapered cones that emerge from each other, whereas each of these includes a different angle with respect to the centerline (29). The transitions between the tapered cones may be rounded. Instead of part of the tapered cones of the implant neck (52), free-form surfaces can also be used.

The outer edge (33) of the implant flange (31) has a distance to the centerline (29) that may be variable. In the illustrated example, it is constant. It amounts to, for example, 2.23 mm. Thereby, the edge (33) is the outer boundary of the reference plane (38) or the end surfaces (77) according to FIGS. 6 and 7. Thereby, the outer edge (33) does not experience any height offset in the longitudinal direction of the centerline (29). With other embodiments, however, it is conceivable at least in some areas. It can then reach, for example, up to 2 mm.

Above the implant flange (31), the area (21) of the superstructure support (20) extends in the form of an implant post (23).

The hollow implant post (23), which is e.g. 4.03 mm high, has the shape of a hexagonal straight truncated pyramid. The truncated pyramid here has six long pyramid edges, in the area of which the studs (26) are arranged. The outer surfaces (27), which are oriented in a manner radially outward, of the studs (26) are partial surfaces of a conceived enveloping surface (28) in the form of, for example, a straight truncated cone shell. Thereby, the outer surfaces (27) can lie on, below or above the theoretical pyramid edges. The overhang or recess can amount to up to 0.2 mm. The taper angle of the enveloping surface (28) usually measures 5 to 12 angular degrees. Here, the taper angle amounts to, for example, 7.36 angular degrees. The truncated cone shell-shaped enveloping surface (28) tapers with increasing distance from the implant flange (31).

Figure 4:
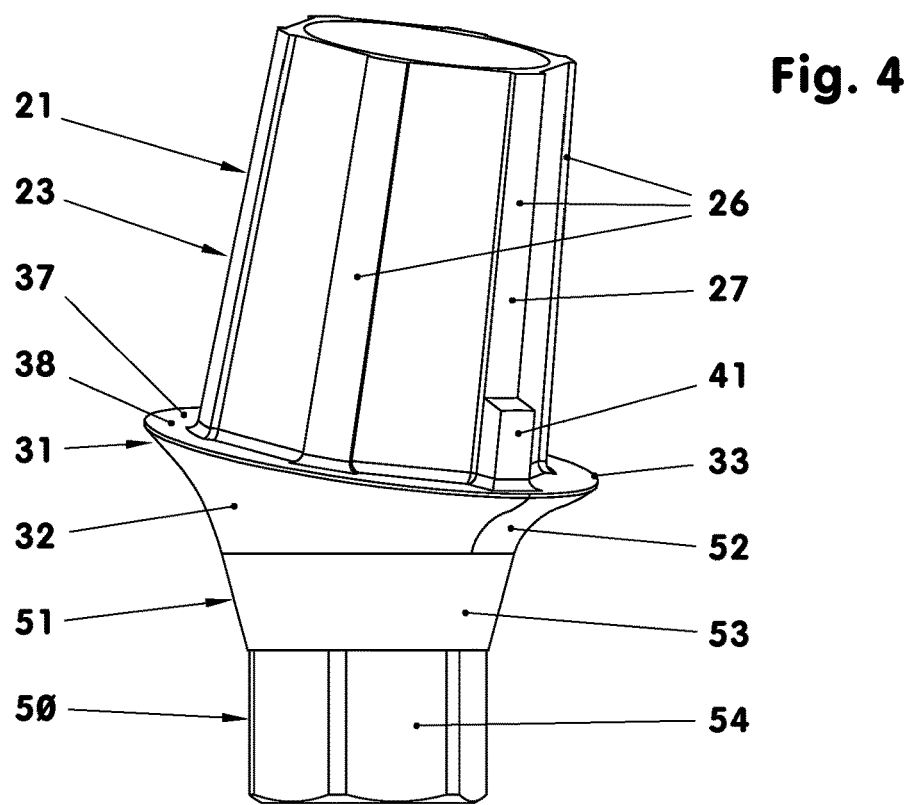
FIG. 4: Superstructure support, perspective.
Figure 5:
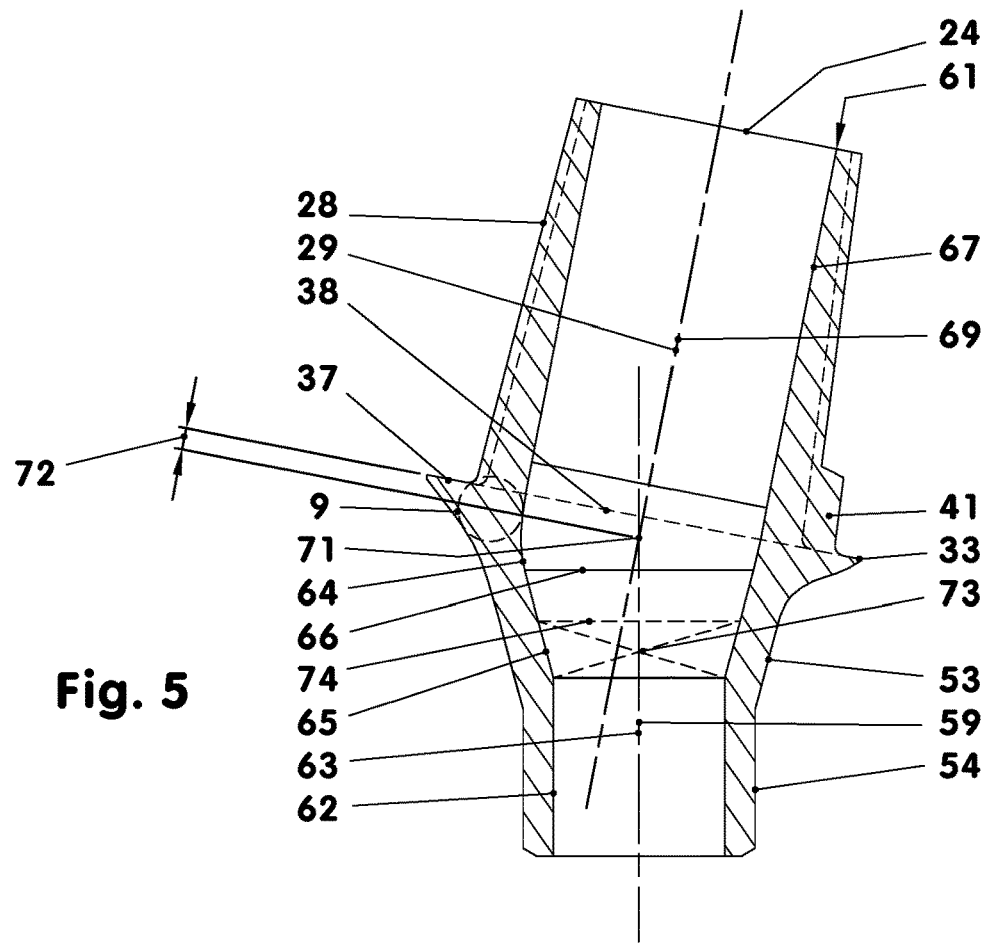
FIG. 5: Superstructure support in longitudinal section with a flat support enveloping surface.

In FIGS. 4 and 5, the implant post (23) has, for example, near the implant flange (31) on one of the studs (26), an anti-twist bar (41) that is, for example, 0.85 mm long, which protrudes 0.25 mm beyond the conceived truncated cone shell-shaped enveloping surface (28). The average width of the anti-twist bar (41) amounts to, for example, 0.58 mm. This special shape of the implant post (23) gives rise to an anti-twist base for the adhesive body (100) to be carried.

The implant post (23) ends at the top with an upper side (24), which may also serve as a bearing surface. The latter, see FIG. 5, is normally aligned with the centerline (29).

The implant post (23) has, for example, a rounded transition area (34) towards the implant flange (31). Around the transition area (34), the implant flange (31) has a flange upper side (37) forming a plane (38), as shown in FIGS. 4 and 5. The plane (38) bounded on the outside by the edge (33) is intersected by the centerline (29), for example centrally and perpendicularly. The large flange upper side (37) forms, among other things, a mounting surface for the adhesive body (100) and/or the tooth crown (120).

Figure 7:
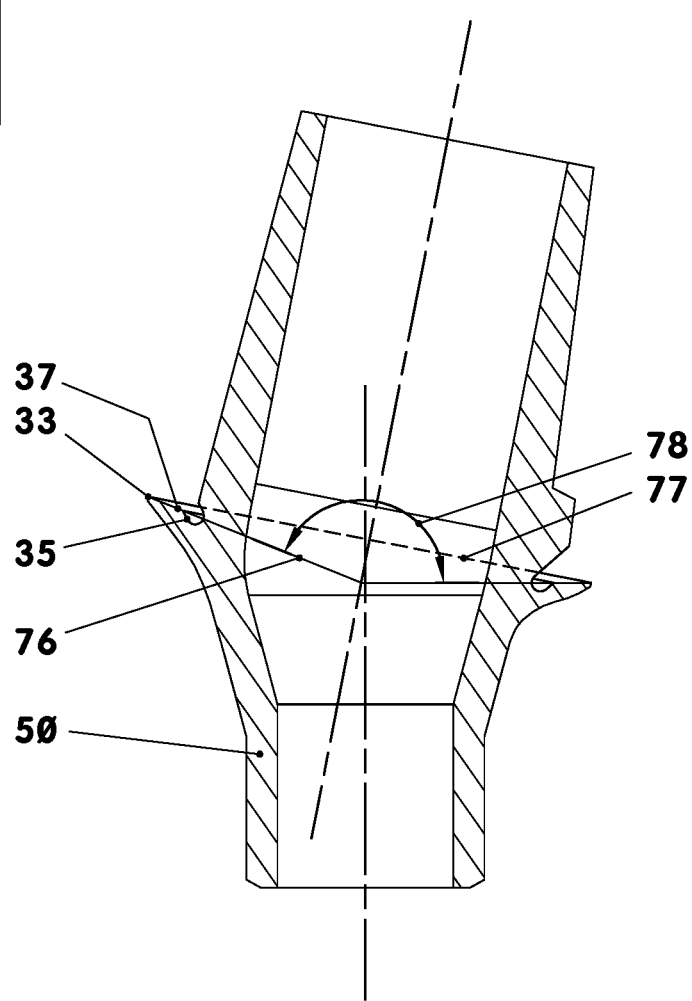
FIG. 7: Same as FIG. 5, but with the support enveloping surface curved downwards.

The rounded transition area (34) can also be deepened in an axial direction parallel to the centerline (29) by up to 0.2 mm, such that a circumferential channel (35), for example, is formed between the flat flange upper side (37) and the implant post (23), see FIG. 7.

In addition, the superstructure support (20) is equipped with a titanium nitride coating at least above the implant flange (31). Its layer thickness amounts to, for example, 1 to 4 µm. Alternatively, thin-walled ceramic or copolymer coatings can also be applied there.

According to FIG. 1, the superstructure support (20) has a continuous cavity (61), which has, in its central area, a kink point with an included angle of 73±13 angular degrees. The finished cavity (61) consists of three cavity zones. The lower cavity zone (62) belongs to the implant pin (50). It is, for example, a cylindrical hole with a length of, for example, 1.81 mm, the diameter of which, for example, amounts to 1.73 mm. The inner cone (65), which expands upwards, is connected to it. The inner cone, which is, for example, 1.08 mm high, has a taper angle of, for example, 30 angular degrees. It serves to support the head section of the screw (90) and lies below the reference plane (38). The hole (62) and the inner cone (65) have a common centerline (63), which is congruent, for example, with the centerline (59) oriented on the outer wall of the implant pin (50).

According to FIG. 3, the shaft (96) of the hexagon head screw (90) traverses this hole (62) when the prosthesis is mounted, whereas its shaft (96) does not contact the wall of the hole (62).

The upper cavity zone (67), which extends in the implant post (23), is a cylindrical hole whose diameter measures, for example, 2.42 mm with a length of 3.7 mm. It is used to insert the screw (90) and guide the tool used to tighten the screw (90). Its centerline (69) is, for example, aligned in a manner concentric with the centerline (29) of the implant post (23) oriented to the outer wall. The hole (67) ends, for example, approximately 0.33 mm in front of the reference plane (38) of the implant flange (31).

In the embodiment, both centerlines (63) and (69) intersect in the central cavity zone (64) at an intersection point (71) connecting the upper (67) and lower (62) cavity zones. The central cavity zone (64) is a curved recess in which the hole (67) and the inner cone (65) are connected to each other, for example in edge-free tangential transitions. Thereby, the interface (71) is located at a distance (72) below the reference plane (38). The distance here amounts to, for example, 0.22 mm. In addition, the intersection point between the reference plane (38) and the centerline (69) is spaced apart from the intersection point between the opening surface along the top edge (66) of the screw head seat space (65) and the centerline (63) by a distance, the length of which amounts to at least 17 percent of the average diameter of the lower cavity zone (62). All of this enables a screw (90) to be seated deep in the superstructure support (20). The latter is thus located in the lower half of the superstructure support (20).

Figure 6:
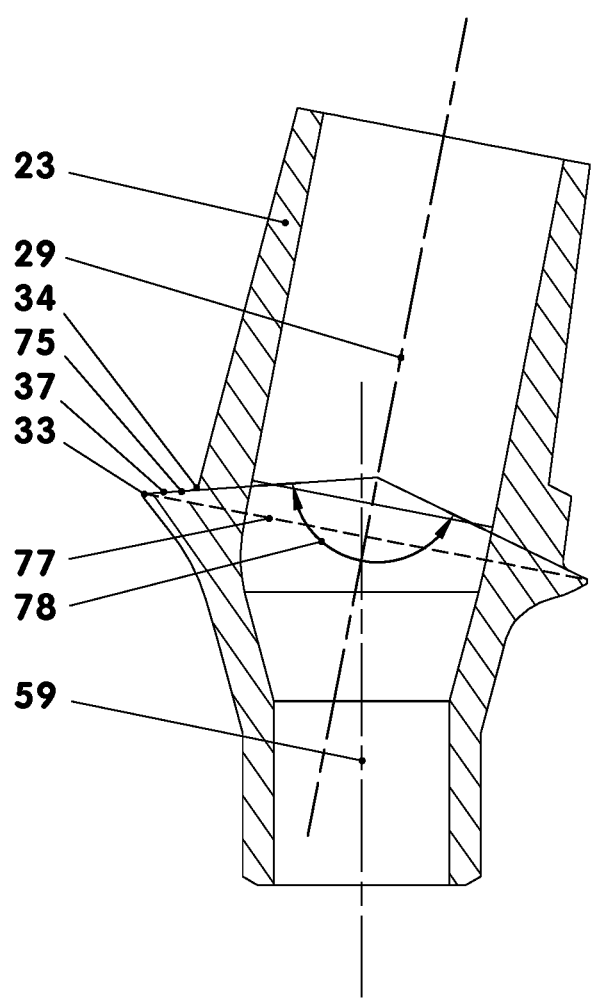
FIG. 6: Same as FIG. 5, but with the support enveloping surface curved upwards.

FIGS. 6 and 7 show two superstructure supports (20), the implant flange (31) of which has, instead of a flat flange upper side, a truncated cone shell-shaped support enveloping surface (75, 76). According to FIG. 6, the truncated cone shell surface (75) is oriented so that its conceived tip lies in the area of the implant post (23). According to FIG. 6, the taper angle (78) amounts to, for example, 150 angular degrees. In such a case, the reference plane (38) of FIG. 5 is replaced by the large end surface (77) of the truncated cone shell (75). The end surface (77) spans from the edge (33) of the implant flange (31).

According to FIG. 7, the truncated cone shell-shaped support enveloping surface (76) of the implant flange (31) is curved downwards, by which the conceived tip of the truncated cone shell-shaped support enveloping surface points in the direction of the implant pin (59). Here as well, the large end surface (77) forms the reference plane (38) below which the intersection point (71) lies. According to FIG. 7, the taper angle (78) measures, for example, 158 angular degrees.

The superstructure support (20) is a slim, thin-walled component that has only slight wall thickness fluctuations over large areas. Individual above-average accumulations of material are structurally avoided. According to FIG. 5, the superstructure support (20) is intersected lengthwise in the plane that is spanned by the two centerlines (59) and (69). In the half-sided cross-sectional area, which is enclosed by the outer and cavity contour of the component, there is a measuring circle (9) at the point of the largest accumulation of material, which measuring circle lies at two points on the cross-sectional outer contour and at one point on the cross-sectional inner contour. This largest measuring circle (9) has a diameter smaller than 25 percent of the average diameter of the lower cavity zone (62).

In the illustrated example, an adhesive body (100) is glued or cemented onto the superstructure support (20), see FIGS. 1 to 3. The adhesive body (100) is a hollow body arranged within the tooth replacement between the superstructure support (20) and the artificial tooth crown (120). It is used to, for example, adjust the angular position of the tooth crown (120) to the angular position of the implant post (23).

The adhesive body (100) essentially has a sleeve-shaped (for example, largely rotationally symmetrical) shape. Its inner wall (105) is adapted at least in some areas—in the radial direction—to the enveloping surface (28) of the implant post (23). An exception is the anti-twist device (41) arranged between the adhesive body (100) and the superstructure support (20).

The adhesive body (100) has a widened (for example, circumferential) edge area (107), with which, on the one hand, it is supported—in the axial direction—on the flange upper side (37) of the superstructure support (20) and with which, on the other hand, it provides an axial support, at least in some areas, for the crown (120) itself.

The assembly clearance between the supporting superstructure support (20) and the attachable adhesive body (100) amounts to, for example, 30 to 50 µm, such that the adhesive body (100) can be supported over a large area on the implant post (23) of the superstructure support (20) with the interposition of an adhesive (113).

In order to be able to sit on the superstructure support (20) in a rotationally fixed manner, the adhesive body (100) has a groove (108) in its, for example, conical recess (106), for example in the lower area, on the flanks of which the anti-twist bar (41) of the superstructure support (20) is supported. In the area of its upper side (102), it has a hole-like recess (106) that, when the prosthesis is mounted, represents an extension of the hole (67) of the implant post (23). After tightening the screw (90), the recess (106) can be filled with a filling material (8) if necessary.

The hexagon head screw (90) is divided into three areas: a head area (91), a shaft area (96) and a thread area (97), see FIGS. 1 and 3. The first area is the head area (91). It comprises a conical head section (92) and a tool recipient (94) arranged thereon. The head section (92), which is, for example, 1.03 mm high, has the shape of a truncated cone tapering in the direction of the thread area (97), which has, for example, a cone angle of 30 angular degrees. The conical area with which the screw (90) lies against the superstructure support (20) has a maximum length of, for example, 0.83 mm. Its largest diameter here is 2.06 mm.

The head section (92) ends in an outwardly curved, conical head section end surface (93), the cone angle of which amounts to, for example, 160 angular degrees. An integrally formed tool recipient (94), which represents a spherical outer hexagon for a spanner gap of 1.45 mm, sits on the head section end surface (93). The outer hexagon has six adjacent bearing flanks, each consisting of three surface sections. Each of the upper and lower surface sections (85, 86) extends over, for example, 0.4 mm of the tool recipient height. Both surface sections are flat and include, for example, an angle of 11.5 angular degrees with the screw centerline (89). The upper ends of the upper surface sections (85) incline toward the screw centerline (89) like the lower ends of the lower surface sections (86). Between each of the two planar surface sections (85, 86) arranged one above the other, a surface section (87) curved outwards in an arched manner is arranged. Its curvature oriented transversely to the screw centerline (89) has a radius of, for example, 0.9 mm.

To tighten the screw (90), a tube wrench with an inner hexagon socket can be attached to the tool recipient (94). Due to the special assembly of the upper and lower surface sections (85, 86), the tube wrench does not experience any reaction force along its longitudinal expansion during the transmission of torque. The front end face of the tube wrench rolls off on the truncated cone shell-shaped head section end surface (93) of the screw head (92) with low friction and no interference.

The conical area of the head section (92) is connected, for example tangentially connected, to the second area, i.e. the shaft area (96). The expansion screw-like shaft area (96) consists of a concave rotationally symmetrical midsection, which has its smallest diameter (for example, 1.3 mm) in the screw center area, for example 3.5 mm from the free end of the head area (91). The average curvature of the outer contour of the midsection has a radius of, for example, 4.44 mm in the section according to FIG. 3.

The third area is the thread area (97). It has, for example, a rolled M1.6 thread, the usable length of which amounts to, for example, 2.6 mm.

According to the illustrated example, the tooth crown (120) sits on an adhesive body (100). Accordingly, the inner wall (125) of the tooth crown (120) is adapted to the outer wall (101) of the adhesive body (100). Here as well, the clearance between the outer wall (101) and the inner wall (125) is between 30 and 50 µm. The adhesive body (100) and the tooth crown (120) are designed in the area of the edge (132) of their adhesive joint (131) in such a manner that the last tenths of a millimeter meet the common prosthesis outer surface (2) at an angle of 90±10 angular degrees. In the area of the edge of its adhesive joint (131), the outer surface (121) of the tooth crown (120) and the outer surface (101) of the adhesive body (100) merge into one another tangentially or at least almost tangentially. If a kink is provided at that point, its included angle lies in an area that is smaller than 180 and larger than 175 angular degrees.

Thus, according to FIG. 3, with the finished prosthesis, the superstructure support 20 is seated in a rotationally fixed manner by means of an implant cone 53 and the anti-twist profile 54 and screwed in the conical seat 14 of the implant body 10 by means of the screw 90. The contact surface (73), in which the head section (92) introduces the screw clamping force into the conical seat (14), is bordered with dashes and marked with dashed diagonals in FIG. 3.

Typically, the implant neck (52) and the lower side (32) of the implant flange (31) are in contact with the gum (not shown here). The combination of the adhesive body (100) and the artificial tooth crown (120) sits on the implant flange (31) by means of gluing.

Several text passages, according to which planes are intersected perpendicularly (for example, by centerlines), are mentioned in the printed text. In such cases, angular deviations of ±2 angular degrees are to still be considered as perpendicular.

LIST OF REFERENCE SIGNS

1 Tooth replacement, prosthetic
2 Prosthesis outside surface
8 Cement, adhesive, filling material
9 Measuring circle
10 Implant body
11 External thread
12 Implant shoulder
13 Recess, stepped
14 Inner cone, first zone, cone, conical seat
15 Inner hexagon socket, second zone, counter profile
17 Threaded hole, third zone
187 Internal thread
19 Centerline of (10)
20 Superstructure support, part of a hybrid abutment
21 Area turned towards the tooth crown
23 Implant post
24 Upper side, bearing surface
26 Stud
27 Outer surface, radial
28 Enveloping surface
29 Centerline of (23)
31 Implant flange
32 Lower side, surface turned towards the gum
33 Edge
34 Transition area, bucket
35 Channel
37 Flange upper side, support enveloping surface
38 Plane, reference plane
41 Anti-twist bar, anti-twist device
50 Implant pin
51 Area turned towards the implant body
52 Implant neck
53 Implant cone, outer cone
54 Anti-twist profile, outer hexagon
59 Centerline of (50)
61 Cavity, kinked; screw insertion recess
62 Lower cavity zone; hole, cylindrical
63 Centerline of (62)
64 Central cavity zone
65 Screw head seat space, inner cone, cavity zone
66 Top edge of (65)
67 Upper cavity zone; hole, cylindrical
69 Centerline of (67)
71 Intersection point
72 Distance between (38) and (71)
73 Contact surface between (65) and (92)
74 Edge, top; of (73)
75 Truncated cone shell surface, support enveloping surface; curved upwards
76 Truncated cone shell surface, support enveloping surface; curved downwards
77 End surface, size of (75) or (76)
78 Taper angle of (75) or (76)
85, 86 Surface sections of (94), flat
87 Surface sections of (94), curved
89 Screw centerline
90 Hexagon head screw, screw
91 Head area
92 Head section, conical; screw head
93 Head section end surface
94 Tool recipient; outer hexagon, spherical
96 Shaft area, midsection, shaft
97 Thread area, thread
100 Adhesive body, part of a hybrid abutment
101 Outer wall, outer surface
102 Upper side
105 Inner wall, inner surface
106 Recess, truncated cone shell-shaped
107 Edge area
108 Groove
111 Adhesive joint between (23) and (100)
113 Adhesive
120 Tooth crown, artificial, superstructure
121 Outer wall, outer surface
125 Inner wall, inner surface
131 Adhesive joint between (100) and (120)
132 Adhesive joint edge
133 Adhesive

The invention claimed is:
1. A superstructure support for forming part of a prosthetic tooth replacement between an implant body and a superstructure, comprising:

a hollow implant post;

a hollow implant pin; and an implant flange arranged between the hollow implant post and the hollow implant pin, wherein the hollow implant post has an outer surface that extends between the implant flange and a top of the superstructure support, wherein the outer surface of the hollow implant post is circumferentially closed along its entire extension, wherein a cavity zone of the implant post and a cavity zone of the implant pin transition into each other to conduct and receive a screw connecting the superstructure support and the implant body, wherein the cavity zone of the implant post has a centerline which intersects or crosses a centerline of the cavity zone of the implant pin at an angle of 160 to 186 angular degrees, wherein the cavity zone of the implant pin has a screw head seat space that widens towards the implant flange for supporting a screw that can be inserted through the hollow implant post into the hollow implant pin, wherein at least some areas of the implant flange form a support enveloping surface oriented towards the implant post, an outer edge of which spans a reference plane that is cut perpendicularly by the centerline of the cavity zone of the implant post, and wherein both centerlines intersect or cross below the reference plane.

2. The superstructure support according to claim 1, wherein the support enveloping surface either lies in the reference plane or is a truncated cone shell surface of a truncated cone, a cone angle of which is between 180 and 165 angular degrees, and a larger end surface of which represents the reference plane.

3. The superstructure support according to claim 2, wherein the screw head seat space is curved in a conical, spherical, or ellipsoid manner.

4. The superstructure support according to claim 3, wherein the screw head seat space is arranged below the reference plane.

5. The superstructure support according to claim 3, wherein a first intersection point between the reference plane and the centerline of the cavity zone of the implant post is spaced apart from an intersection point between an opening surface along an upper edge of an area of a contact surface against which the screw rests and the centerline of the cavity zone of the implant pin by a distance, a length of which amounts to at least 50 percent of an average diameter of the lower cavity zone.

6. The superstructure support according to claim 2, wherein the screw head seat space changes its cross-section transverse to an axis of rotation of the screw head seat space.

7. The superstructure support according to claim 1, wherein each half-sided longitudinal section of the superstructure support, with which a section plane is spanned by the centerlines of the implant pin and the implant post, does not include a measuring circle, a diameter of which is greater than 25 percent of an average diameter of an implant cone.

8. The superstructure support according to claim 7, wherein the cavity zones of the superstructure support harmonically transition into each other.

* * * * *